H. HOPKINS.
Smut Machine.
No. 21,563. Patented Sept. 21, 1858.
Fig: 1.
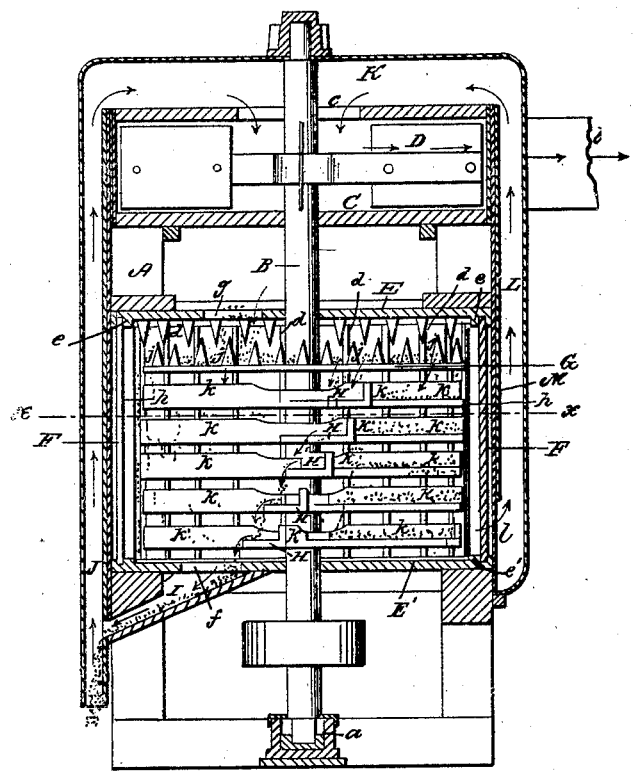
Fig: 2.
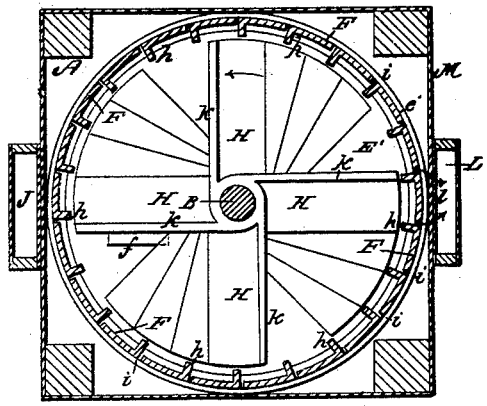

UNITED STATES PATENT OFFICE.

HIRAM HOPKINS, OF EVANSVILLE, INDIANA.

IMPROVEMENT IN SMUT-MACHINES.

Specification forming part of Letters Patent No. 21,563, dated September 21, 1858.

*To all whom it may concern:*

Be it known that I, HIRAM HOPKINS, of Evansville, in the county of Vanderburg and State of Indiana, have invented a new and Improved Smut and Grain-Cleaning Machine; and I do hereby declare that the following is a full, clear, and exact description of the same, reference being had to the annexed drawings, making a part of this specification, in which—

Figure 1 is a vertical central section of my invention. Fig. 2 is a horizontal section of the same, taken in the line $x\,x$, Fig. 1.

Similar letters of reference indicate corresponding parts in the two figures.

This invention consists in the employment or use of a scourer peculiarly constructed and used in connection and arranged relatively with blast-spouts and a fan, as hereinafter fully shown and described, whereby the desired work—to wit, the effectual cleaning of the grain from smut and other impurities and foreign substances—is performed very expeditiously and by a very simple and inexpensive arrangement of means.

To enable those skilled in the art to fully understand and construct my invention, I will proceed to describe it.

A represents a rectangular framing properly braced and made sufficiently strong to firmly sustain the working parts. B is a vertical shaft, which is placed centrally in the framing A, its lower end being stepped at $a$. In the upper part of the framing A a fan-box C is placed, D being the fan placed therein, and on the shaft B. The fan-box C has an eduction-opening $b$ at its side and an induction-opening $c$ at the center of its top plate.

In the framing A, just below the fan-box C, the scourer is placed. This scourer is constructed as follows: Two circular plates E E' are secured horizontally in the framing A one above the other and at a suitable distance apart. The under surface of the upper plate E has teeth $d$ projecting down from it, and a groove $e$ is formed in said plate all around it near its edge. (See Fig. 1.) The upper surface of the lower plate E' has a similar groove $e'$ made in it, and has an opening $f$ made through it, the object of which will be presently explained. The upper plate E also has an opening $g$ made in it.

F represents a series of vertical bars to the inner parts of each of which, near one edge, a projection or ledge $h$ is formed, said projections having radial positions, as shown clearly in Fig. 2, and extending the whole height of the bars, as shown in Fig. 1. The bars E form the casing of the scourer, and spaces $i$ are allowed between the bars, as shown clearly in Fig. 2. On the shaft B a circular plate G is placed, said plate having teeth $j$ on its upper side, which teeth are placed in line with the centers of the spaces between the teeth $d$ of the upper plate E. (See Fig. 1.)

On the shaft B, and between the two plates E E', a series of radial arms H are placed. There are four sets of these arms, and each set projects in spiral form from the shaft, one arm overlapping the other. Each arm H has a vertical ledge $k$ at one side.

The opening $f$ communicates with a spout I, the lower end of which is connected with the lower end of a vertical spout J, attached to one side of the framing A. The upper end of spout J is connected with one end of a horizontal spout K, which is placed in the upper part of the framing A and communicates with the fan-box C. The opposite end of the spout K is connected with a vertical spout L, which is attached to the framing A at the side opposite to that where the spout J is attached. The lower end of the spout L communicates with the lower part of the scourer, as shown at $l$. The scourer is tightly inclosed by a box M.

The operation is as follows: The shaft B is rotated in any proper manner and the grain (shown in red) to be cleaned and separated from impurities is fed into the upper part of the scourer through the opening $g$, and is acted upon by the arms H and the ledges $k$, which parts serve as beaters, the projections $h$ of the bars F assisting the operation by checking the passage of the grain around within the scourer. The grain passes down upon the several arms and is subjected to thorough beating and scouring, the smut-balls being broken and all dust removed from the grain. The grain as it passes down through the scourer, and also while passing out from the machine, is subjected to a blast during the whole of its passage, the blast being generated by the fan D. The blue arrows show the direction of the blast. The dust and dirt pass through the openings $i$ of the case or shell of the scourer and into the spout L at $l$. The cleansed grain is discharged from the lower end of J.

By this invention the dust, smut, and other impurities are discharged from the scourer as fast as they are loosened or scoured therefrom. The machine as a whole is extremely simple and efficient in its operation. It is now in practical operation and works in a most satisfactory manner.

I am aware that scourers have been constructed in various ways and used in connection with blast-spouts, and therefore do not claim separately any of the parts irrespective of the construction and arrangement of parts herein shown and described; but,

Having thus described my invention, what I claim as new, and desire to secure by Letters Patent, is—

The scourer constructed of the vertical bars F, provided with radial projections $h$ at their inner sides, and the arms H, provided with ledges $k$ and attached to the shaft B, when said scourer thus constructed is inclosed by a box M and arranged relatively with the blast-spouts J K L and fan D, to operate as and for the purpose set forth.

HIRAM HOPKINS.

Witnesses:
FLEMING DURHAM,
W. CALDWELL.